July 22, 1924.

C. F. HUSSEY 1,502,569

MEASURING APPARATUS

Filed May 2, 1921

C. F. HUSSEY

MEASURING APPARATUS

Filed May 2, 1921

C. F. HUSSEY 1,502,569

MEASURING APPARATUS

Filed May 2, 1921

Charley F Hussey INVENTOR.

BY Erwin Wheeler & Woolard ATTORNEYS.

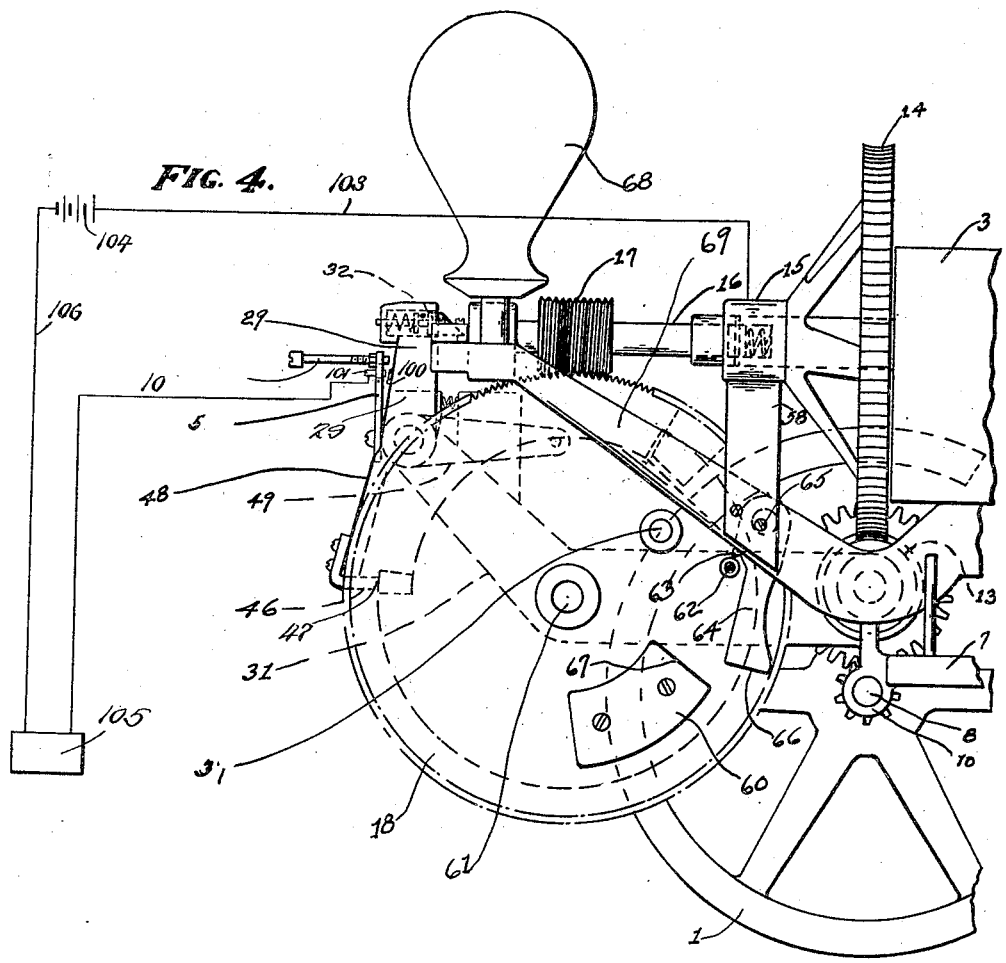

Patented July 22, 1924.

1,502,569

UNITED STATES PATENT OFFICE.

CHARLEY F. HUSSEY, OF MILWAUKEE, WISCONSIN, ASSIGNOR TO PRECISION MACHINE COMPANY, OF MILWAUKEE, WISCONSIN, A CORPORATION OF WISCONSIN.

MEASURING APPARATUS.

Application filed May 2, 1921. Serial No. 466,355.

*To all whom it may concern:*

Be it known that I, CHARLEY F. HUSSEY, a citizen of the United States, residing at Milwaukee, county of Milwaukee, and State of Wisconsin, have invented new and useful Improvements in Measuring Apparatus, of which the following is a specification.

This invention relates to measuring apparatus and is particularly directed to such an apparatus adapted to be applied to a machine to measure the output of the machine.

Objects of this invention are to provide a measuring apparatus which may be coupled operatively with a machine of any desired speed of production; which is adapted to automatically register the extent of production; which is adapted to automatically control the machine after a predetermined extent of production has occurred and has been registered; and which is adapted to be applied to standard machines in a simple and efficacious manner.

Further objects are to provide a measuring apparatus which is particularly adapted for winding machines to measure the length of yarn passing over such apparatus; which is adapted to co-operate with the passing yarn without necessitating elaborate connections with the mechanism of the machine; and which will register the amount of yarn passed or wound by the machine and will stop the machine after a predetermined amount has been registered.

Further objects are to provide a measuring apparatus in which the operative parts will automatically reset themselves when disconnection has occurred; which will automatically reset the control apparatus at its initial point; and which is provided with manual means whereby the registering and control device may be quickly coupled with the operating or driving device of the apparatus and at the same time move the control mechanism to a position to permit restarting of the machine.

For the purpose of illustrating an application of the invention an embodiment thereof has been shown as applied to a winding machine. In the drawings:

Figure 4 is a fragmentary side elevation showing the opposite side of the machine from that shown in Figure 2.

Figure 1:
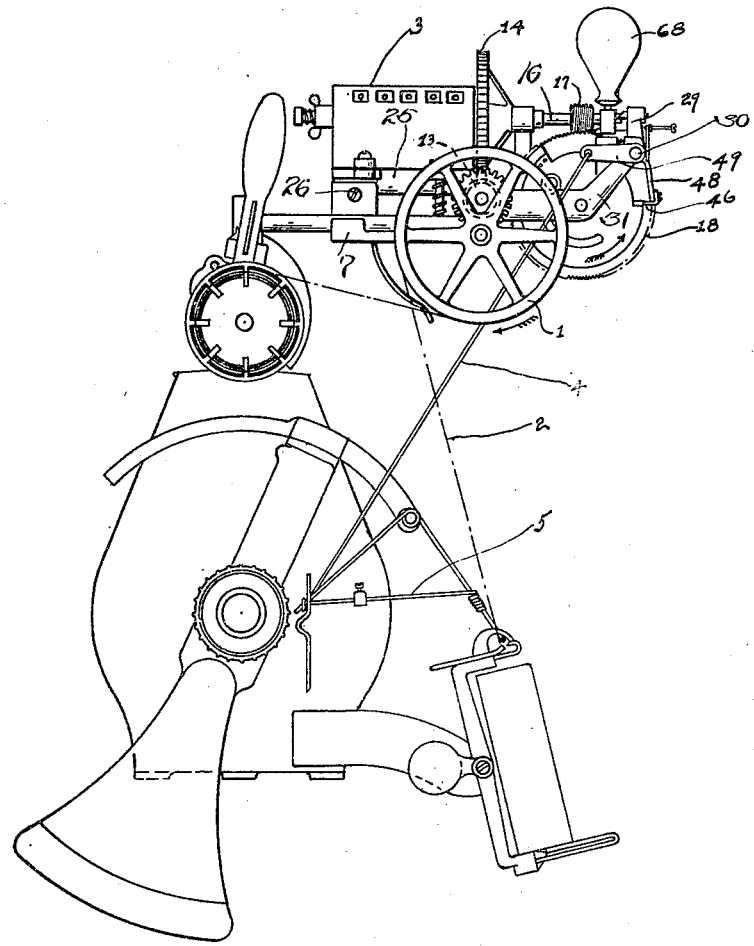
Figure 1 is an end elevation of a winding machine with the measuring apparatus in operative position thereon.

Figure 1 shows the measuring apparatus applied to a winding machine and shows the various parts of the device in the position they assume while a winding operation is in progress. A driving wheel 1, over which the yarn 2 passes, is connected by suitable reduction gearing with a counter indicated generally at 3. A link 4 connects suitable trip operated mechanism with a control rod, or stop rod, 5 on the winding machine so that after a predetermined length of yarn has been wound the control rod 5 is lifted thru the medium of the link 4, thereby actuating the usual stop mechanism of the machine and causing the winding operation to cease. Simultaneously, with this stopping of the machine, the counting mechanism is disconnected from the driving wheel 1 and is automatically reset in a manner to be subsequently described. A convenient way of supporting the apparatus is to provide its base portion with an integral extension, which is socketed at 6 (Fig. 3), to accommodate the tie rod of the winding machine, and is extended upon the opposite side 7 so as to provide a portion adapted to be secured to a co-operating portion of the winding machine.

Figure 2:
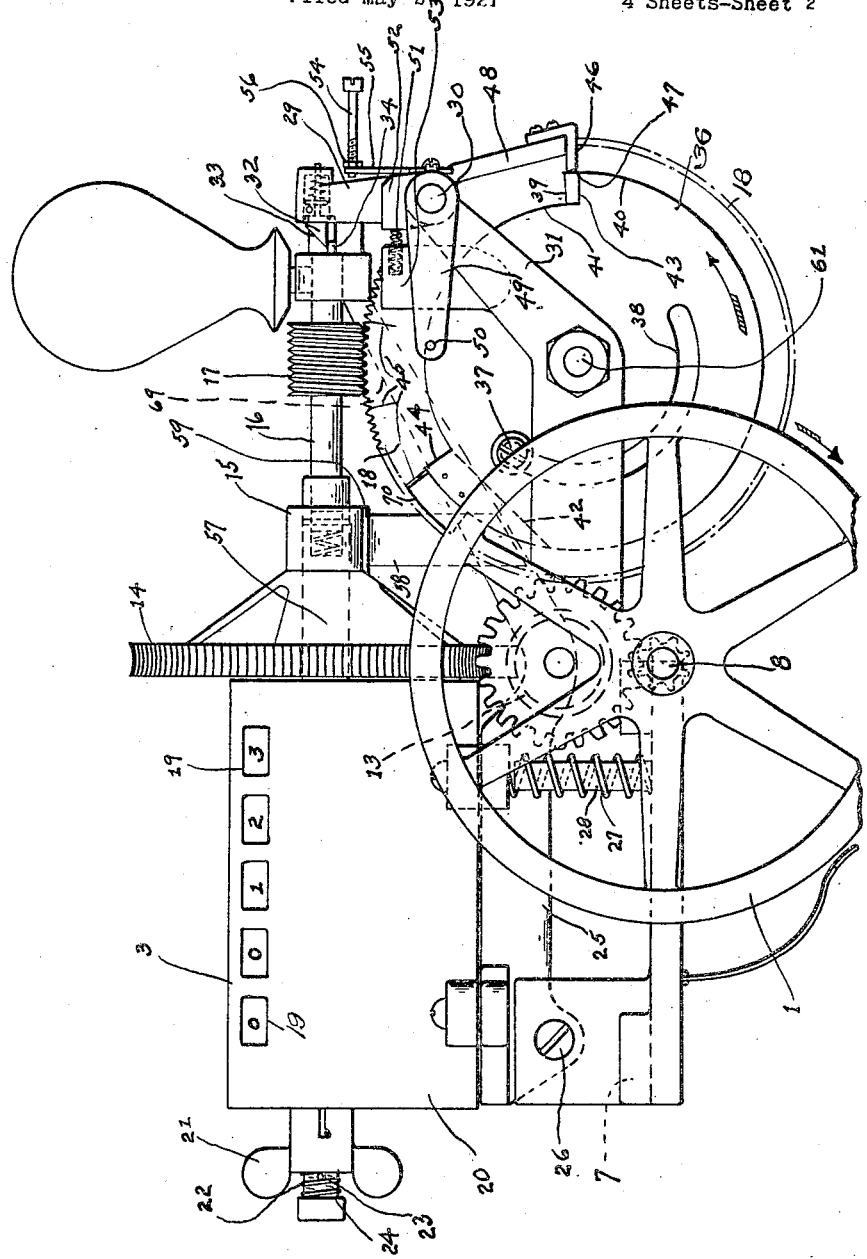
Figure 2 is a side elevation of the measuring apparatus.
Figure 3:
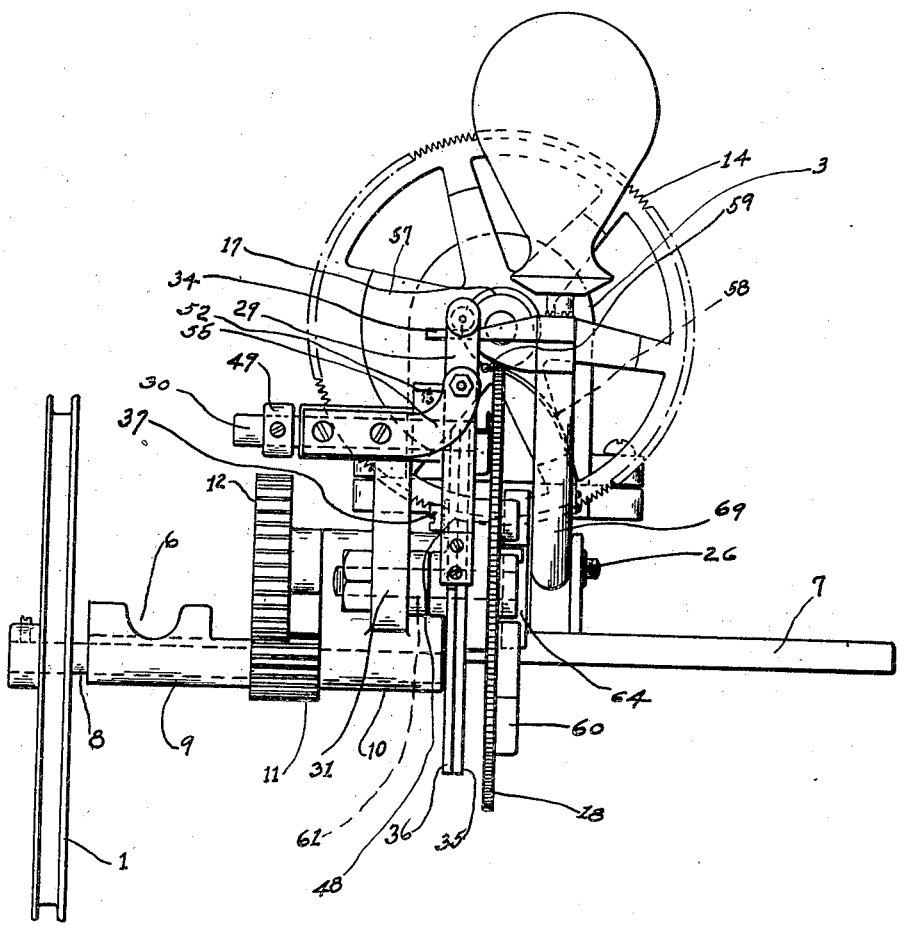
Figure 3 is an end elevation thereof.

Figures 2, 3 and 4 show the apparatus on an enlarged scale. The driving wheel 1 is rigidly secured upon a transverse shaft 8 which is journaled in the portions 9 and 10 of the base. This driving wheel transmits motion to the counter 3 by means of the pinion 11, gear 12, worm 13 and worm wheel 14. The worm wheel 14 is rigidly secured by means of its hub 15 upon the main longitudinal shaft 16 of the counter 3, such shaft being extended to the right (Figure 2) and provided with a worm 17. The worm 17 co-operates, and normally meshes with a cam operating worm wheel 18 which may conveniently be positioned below the axis of the shaft 16.

The counter 3 may be of any desired construction and is preferably of the type forming the subject matter of my United States Patent No. 1370540 of Nov. 8, 1921.

The counting elements thereof are adapted to be actuated by the rotation of the shaft 16 and cause the numbered portion of dials to appear opposite corresponding windows or openings 19 formed in the casing 20, which casing may conveniently be locked in position in any suitable manner against unauthorized tampering therewith. The left portion of the counter (Figure 2) is equipped with a clearing manually operated thumb piece 21 which is adapted to be moved rearwardly against the action of the spring 22 when the clearing operation is to be performed. It is to be noted that this clearing device may be locked against unauthorized manipulation by means of a padlock whose hasp may be passed thru an opening 23 formed in the stud 24.

The shaft 8, the reduction gearing, the worm 13 and the worm wheel 18 are all carried by the base portion. The counter 3, the shaft 16 and the worm 17 are carried by a frame 25 (Fig. 2) which is pivotally joined at 26 to the base portion. A spring 27 loosely mounted upon a pin 28 and extending upwardly from the base portion bears at its upper end against a projecting lug formed upon the carriage of the frame 25 and urges such frame upwardly, thereby tending to move the worm wheel 14 and the worm 17 upwardly about the pivot 26 away from their co-operating elements, viz:—the worm 13 and the worm wheel 18.

The upward rocking motion of the frame 25 is prevented by means of a latch lever 29 rigidly attached to a shaft 30 which is loosely pivotally carried by an arm 31 extending upwardly from the base of the device as best shown in Figs. 2 and 4. The upper portion of this lever carries a plunger 32 which is spring-pressed outwardly and is equipped upon its upper face with a cam surface 33. This plunger latches over a lug 34 which forms a portion of the frame 25 when the frame is moved downwardly, and thereby prevents upward motion of the frame until the latch is released.

Upon the cam worm wheel 18 or upon a hub formed integrally therewith, a pair of cam plates 35 and 36 (Fig. 3) are positioned. A screw 37 passes thru an arcuate slot 38 formed in the plate 36 and thru a hole in the plate 35, into the hub of the worm wheel 18, thereby definitely securing the innerplate 35 in fixed relation to the worm wheel 18 and adjustably securing the outer plate 36 with reference to the worm wheel.

The inner plate has an abrupt radial shoulder 39 (Fig. 2) which joins at one point of the plate the outer circular peripheral portion 40 and the inner circular peripheral portion 41. It is cut along a portion at any desired point thereof, depending upon the type of machine employed, upon a slanting line 42 which joins the inner and outer peripheral portions. The outer plate is similarly provided with coinciding inner and outer peripheral portions and with a pair of abrupt shoulders 43 and 44. The worm wheel 18 is provided with a series of marks or indicating gauge lines 45 at any one of which the shoulder 44 may be set when the screw 37 is loosened. A cam follower 46 (Figs. 2 and 4) is adapted to ride upon the outer periphery 40 of the disks and is provided at its inner end with a slanting cam face 47. This follower is secured to a lever 48 forming an extension of the lever 29, such levers being rigidly fastened upon the shaft 30. A control lever 49 is also rigidly fastened to the shaft 30 and is provided with an eyelet 50, adjacent its outer end, adapted to receive the pitman or link 4 (Fig. 1) and to thereby connect the control rod 5 of the winding machine with this cam operated catch mechanism. A spring 51 is positioned between an arm 52, rigidly fastened to the shaft 30, and a lug 53 carried by the arm 31 of the base and is conveniently retained in position by having one end thereof seated within an elongated socket formed in such lug. If desired, an adjusting stop screw 54 may be carried by an upstanding arm 55 and locked in adjusted position by means of the lock nut 56 to thereby limit the outward throw of the lever 29.

When the driving wheel is rotated, in the direction indicated by the passing yarn, motion is transmitted thru the reduction gearing, the worm and worm wheel 13 and 14 respectively, to the shaft 16 and thru the medium of the worm and worm wheel 17 and 18, from such shaft to the cam members 35 and 36 causing them to rotate in the direction indicated by the arrow. As the yarn passes, its length is registered (for example, in yards) by the counter mechanism and the cam members simultaneously rotated in the direction indicated. When the shoulder 44 arrives at the angular edge of the cam follower 46, such follower, under the influence of the spring 51, snaps inwardly, thereby releasing the lug 34 of the main pivotally mounted frame from engagement beneath the catch or plunger 32, thereby permitting such frame to spring upwardly under the influence of the spring 27. When the frame springs upwardly the worm 17 and the worm wheel 14 are disengaged respectively, from the worm wheel 18 and the worm wheel 13. Simultaneously with the releasing of the frame, the lever 49 moves upwardly, as it is rigidly fastened to the shaft 30 and as such shaft is rocked by the spring pressed latch. It thereby draws the link 4 upwardly and moves the control arm 5 upwardly,—the upward motion of this control arm, it is understood, causing the winding machine to cease operating. The predetermined length of yarn at which this response occurs may be varied by setting the shoulder 44 at the desired mark 45, such marks being conveniently spaced apart a distance corresponding to a thousand yards.

The automatic resetting mechanism for placing the counting worm wheel 14 and the cam worm wheel 18 at their initial points will now be described. The counting worm wheel 14 is weighted, as indicated at 57 (Fig. 3), so that such weighted portion tends to drop downwardly into the lowest possible position. A spring 58 is secured to the pivotal frame and extends upwardly and outwardly under the hub 15 of the worm wheel 14. Obviously a pivoted lever either actuated by a weight or a spring may replace the spring 58.

A pin 59 is secured adjacent this hub and is adapted, when the worm wheel 14 rotates backwardly under the influence of the weighted portion 57, to contact with the spring 58 and thereby position the worm wheel at its initial or starting point. The cam worm wheel 18 is provided with a weight 60 (Figs. 3 and 4) which is so positioned that when the cam follower has passed inwardly along the shoulder 44 it will have just passed over the central vertical line of the shaft 61 of the worm wheel 18. This unbalanced weight, therefore, causes the worm wheel 18 and the associated cam disks to rotate until the shoulder 39 engages the cam face 47 of the cam follower 46. As the worm wheel approaches this point, a roller 62 (Fig. 4), carried by a pin mounted on the rear face of the worm wheel 38, engages a cam faced shoulder 63 of a latch member 64 which is loosely pivoted at 65 to the arm 69 of the pivotally mounted frame 25. The co-operation of the roller and cam face causes the bottom end 66 of the latch to rock inwardly and in this inward position it is engaged by the face 67 of the weight 60. It will be seen that the worm wheels have now been set in their proper positions and are ready to be again operatively coupled with the driving wheel 1 thru the intermediate mechanism. The operator now presses downwardly upon a rounded knob 68 carried by an outwardly and upwardly projecting arm 69 of the pivotally mounted frame and thereby causes such frame to rock downwardly into its initial position. As the carriage rocks downwardly the worm wheel 18 is given a slight motion by means of the latch 66 which is in engagement with the weight 60 carried upon such worm wheel. This motion is just sufficient to cause the cam face 47 of the cam follower 46 to ride upwardly and to place such cam follower on the outer or larger circular periphery 40 of the cam disks. At the same time the lug 34 (Fig. 2) on the pivotally mounted frame engages the cam face 33 of the spring-pressed plunger 32 causing such plunger to slide back into its socket and to allow the lug to pass downwardly to be subsequently retained beneath the spring-pressed plunger, thereby locking the frame in the position shown in the drawings and re-establishing the operative connection between the worm 17 and the worm wheel 14 with their respective co-operating worm wheel 18 and worm 13. When the cam follower 46 is rocked outwardly it depresses the lever 49 which, thru the medium of the link 4, moves the control member 5 into a position to allow the restarting of the winding machine.

Thus, it will be seen that as the yarn passes over the driving wheel 1 its length will be registered by counter 3 and after a predetermined length, the trip mechanism will operate to stop the winding machine and to disconnect the counter and the cam members from operative connection with the driving wheel 1. The automatic mechanism will now function to reset the worm wheels 14 and 18. Thereafter it is merely necessary for the operator to press downwardly upon the knob 68 to again operatively connect the elements of the apparatus. Throughout the specification and claims the term "yarn" is used not in its limited sense to define simply a textile strand but is used to define any flexible cord-like member such as ordinary yarn, rope, wire, cord or other flexible material of indeterminate length.

It is contemplated providing an alarm which may be of any desired type and which is actuated when the latch mechanism operates. This alarm may conveniently consist of a contact member 100 secured to the movable portion 29 of the latch mechanism, and a cooperating insulated contact 101 conveniently carried by the arm 55. A wire 102 may lead from this insulated member to an indicator 105 (a bell, for example) and a wire 103 may lead from any portion of the machine to a battery 104. A third wire 106 may lead from the other side of the battery to the indicator 105. It will be seen, therefore, that when the latch mechanism trips, an alarm will be given, thereby apprising the attendant of the fact that the desired number of yards have passed the measuring apparatus. The particular type of alarm is immaterial. The diagrammatic showing is merely conventional of any desired type.

I claim:

1. A device for measuring the length of yarn comprising a driving wheel over which said yarn passes, counting mechanism operatively associated with said driving wheel to register the length of yarn which passes over said driving wheel, and a cam operated catch for disconnecting said counting mechanism from said driving wheel when a predetermined length of yarn has passed over said driving wheel.

2. A device for measuring the length of yarn comprising a driving wheel over which said yarn passes, counting mechanism operatively connected therewith, means for automatically severing said operative connection between said driving wheel and said counting mechanism when a predetermined length of yarn has passed over said driving wheel, and means for automatically resetting said counting mechanism when said operative connection is severed.

3. A device for measuring the length of yarn comprising a driving wheel over which said yarn passes, counting mechanism operatively connected therewith, means for automatically severing the operative connection between said driving wheel and said counting mechanism when a predetermined length of yarn has passed over said driving wheel, means for automatically resetting said counting mechanism when said operative connection is severed, and manual means for re-establishing said operative connection.

4. A device for measuring the length of yarn comprising a driving wheel over which said yarn passes, counting mechanism operatively connected with said driving wheel, cam controlled mechanism for severing the operative connection between said driving wheel and counting mechanism, said cam mechanism being adjustable to operate for any predetermined length of yarn, means for automatically resetting said cam mechanism when the operative connection is interrupted, and manual means for reestablishing said operative connection.

5. A device for measuring the length of yarn comprising a driving wheel over which said yarn passes, cam mechanism operatively connected with said driving wheel, latch mechanism operated by said cam to sever the connection between said cam and said driving wheel when a predetermined length of yarn has passed over said driving wheel, and control mechanism operated by said latch mechanism adapted to stop the passage of yarn over said driving wheel when a predetermined length of yarn has passed.

6. A device for measuring the length of yarn comprising a driving wheel over which said yarn passes, cam mechanism operatively connected with said driving wheel, latch mechanism operated by said cam to sever the connection between said cam and said driving wheel when a predetermined length of yarn has passed over said driving wheel, control mechanism operated by said latch mechanism and adapted to stop the passage of yarn when a predetermined length has passed, and means for automatically resetting said cam mechanism at its initial position after the operative connection has been broken.

7. A device for measuring the length of yarn comprising means operated by the passing yarn, cam mechanism operatively connected therewith, latch mechanism operated by said cam to sever the connection between said cam and said first mentioned means when a predetermined length of yarn has passed, control mechanism operated by said latch mechanism adapted to stop the passage of yarn when a predetermined length has passed, means for automatically resetting said cam mechanism at its initial position after the operative connection has been broken, and manual means for reestablishing said operative connection and for positioning said control mechanism in its initial position.

8. A device for measuring the length of yarn comprising a driving wheel over which said yarn passes, a cam operatively connected with said driving wheel, a control mechanism, a trip mechanism operated by said cam and adapted to move said control mechanism to inoperative position and to sever the connection between said cam and said driving wheel when a predetermined length of yarn has passed over said driving wheel, automatic means for resetting said cam, and manual means for resetting said latch to reestablish operative connection between said driving wheel and said cam and for moving said control mechanism to operative position.

9. The combination with a winding machine having a stopping lever, of a yarn measuring device adapted to be attached to said machine and comprising a driving wheel over which said yarn passes, cam mechanism operatively connected with said driving wheel, a cam follower controlled by said cam and adapted to interrupt the operative connection between said driving mechanism and said cam, and means operatively connecting said cam follower to said stopping lever to stop the winding mechanism when a predetermined length of yarn has passes over said driving wheel.

10. The combination with a winding machine having a stopping lever, of a yarn measuring device adapted to be attached to said machine and comprising a driving wheel over which said yarn passes, cam mechanism operatively connected with said driving wheel, a cam follower controlled by said cam and adapted to interrupt the operative connection between said driving mechanism and said cam, means operatively connecting said cam follower to said stopping lever to stop the winding mechanism when a predetermined length of yarn has passed over said driving wheel, means for automatically resetting said cam mechanism, and manual means for reestablishing said operative connection and for moving said stopping lever into operative position.

11. The combination with a winding machine having a stopping lever, of a yarn measuring device adapted to be attached to said machine and comprising a driving wheel over which said yarn passes, cam mechanism operatively connected with said driving wheel, a cam follower controlled by said cam and adapted to interrupt the operative connection between said driving mechanism and said cam, means operatively connecting said cam follower to said stopping lever to stop the winding mechanism when a predetermined length of yarn has passed over said driving wheel, automatic means for resetting said cam mechanism, and manual means for simultaneously establishing the operative connection between said driving wheel said cam mechanism and for moving said stopping lever into operative position.

12. A device for measuring the extent of production of a machine, comprising means actuated in accordance with the extent of production, trip mechanism operated thereby, automatic means for positioning said trip mechanism at its initial position after said trip mechanism has functioned, control mechanism associated with said trip mechanism to stop the machine when a predetermined extent of production has occurred, and means for resetting said trip mechanism and for restarting said machine.

13. A device for measuring material, said device comprising a framework, a power wheel journaled in the frame and adapted to be driven by the material to be measured, a gear wheel journaled in the frame, a cam operated by said gear wheel, a spring actuated lever pivotally carried by said frame and adapted to be controlled by the cam, a counting device pivotally carried by the frame, means carried by the counting device and said frame for operatively connecting the mechanism therein with the power wheel and gear wheel, and latch mechanism carried by the lever adapted to engage the counting device to hold the counting device in operative relation to the power wheel and gear wheel.

14. A device for measuring material, said device comprising a power wheel adapted to be driven by the material to be measured, pivotally mounted counting mechanism, means for operatively connecting the power wheel and counting mechanism, cam members adapted for relative adjustment to provide a relatively long or short lobe, means for operatively connecting the cam members with the counting mechanism, spring means for disconnecting the power wheel and cam members from the counting mechanism, latch mechanism controlled by the cam members for holding the counting mechanism in operative relation to the power wheel and cam members.

15. A device for measuring material, said device comprising a power wheel adapted to be driven by the material to be measured, cam members adapted for relative adjustment to provide a relatively long or short lobe, mechanism for registering the measurement of the material and adapted to be operatively connected with the power wheel and cam members, and means controlled by said cam member for holding said mechanism in operative connection with the power wheel and cam member and for disconnecting the same when a predetermined quantity of material has been measured.

CHARLEY F. HUSSEY.